United States Patent
Barry et al.

(10) Patent No.: US 10,994,771 B2
(45) Date of Patent: May 4, 2021

(54) METHOD FOR OPTIMIZING A VEHICLE SPEED INDICATOR PARAMETER INTENDED FOR THE STEERING ASSISTANCE FUNCTIONS AND THE SAFETY FUNCTIONS

(71) Applicant: JTEKT EUROPE, Irigny (FR)

(72) Inventors: Olivier Barry, Corbas (FR); Luc Leydier, Feyzin (FR); Romain Moretti, Thurins (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 16/647,786

(22) PCT Filed: Sep. 7, 2018

(86) PCT No.: PCT/FR2018/052191
§ 371 (c)(1),
(2) Date: Mar. 16, 2020

(87) PCT Pub. No.: WO2019/053357
PCT Pub. Date: Mar. 21, 2019

(65) Prior Publication Data
US 2020/0216114 A1    Jul. 9, 2020

(30) Foreign Application Priority Data
Sep. 15, 2017  (FR) ..................................... 17/58567

(51) Int. Cl.
*B62D 5/04*  (2006.01)
(52) U.S. Cl.
CPC .................. *B62D 5/0484* (2013.01)
(58) Field of Classification Search
CPC . B62D 5/0484; B62D 15/0285; B60W 10/20; B60W 30/182; B60W 30/18009;
(Continued)

(56) References Cited

U.S. PATENT DOCUMENTS 5,052,508 A    10/1991  Soejima
6,356,818 B1 *  3/2002  Wakashiro ............... B60K 6/54
                                                701/22
(Continued)

FOREIGN PATENT DOCUMENTS

| | | |
|---|---|---|
| EP | 3 173 314 A1 | 5/2017 |
| FR | 2 971 221 A1 | 8/2012 |
| GB | 2 232 941 A | 1/1991 |

OTHER PUBLICATIONS

Jan. 25, 2019 Search Report issued in International Patent Application No. PCT/FR2018/052191.

*Primary Examiner* — Angelina Shudy
(74) *Attorney, Agent, or Firm* — Oliff PLC (57) ABSTRACT

A method for managing a vehicle assisted steering system including one assistance function intended to help a driver drive the vehicle and one safety function intended to give assistance function a predetermined ASIL level as defined by the ISO-26262 standard, the assistance function and safety function each make use of a vehicle speed indicator parameter, including a step of estimating a functional speed of the actual longitudinal speed of the vehicle, used by default as the vehicle speed indicator parameter, a step of estimating a speed upper bound, a step of calculating an underestimated speed resulting from the application, to the speed upper bound, of a reduction value derived from a reduction law, and, if the functional speed is lower than the underestimated speed, and a step of switching in which the underestimated speed is substituted for the functional speed as the vehicle speed indicator parameter.

13 Claims, 2 Drawing Sheets (58) Field of Classification Search
CPC ............ B60W 40/12; B60W 2510/20; B60W 2510/205; B60W 2510/251; B60W 2510/207; B60W 2520/10; B60W 2050/0028; B60W 60/0018; B60W 2050/0292; B60W 50/12; B60W 60/001; B60W 60/0015
USPC .......................................................... 701/43
See application file for complete search history.

(56) References Cited

U.S. PATENT DOCUMENTS

| | | | | |
|---|---|---|---|---|
| 6,671,601 | B2 * | 12/2003 | Abiru | F16H 61/66254 |
| | | | | 477/107 |
| 8,666,605 | B2 * | 3/2014 | Delarche | B62D 5/0463 |
| | | | | 701/42 |
| 9,707,968 | B2 * | 7/2017 | Wall | B60W 50/12 |
| 9,873,427 | B2 * | 1/2018 | Danzl | B60W 10/04 |
| 10,150,470 | B2 * | 12/2018 | Wang | G05D 1/0223 |
| 10,308,256 | B1 * | 6/2019 | Chan | B60W 30/08 |
| 10,336,363 | B2 * | 7/2019 | Wang | B62D 6/10 |
| 10,407,096 | B2 * | 9/2019 | Moretti | B62D 15/0265 |
| 10,479,400 | B2 * | 11/2019 | Michelis | B60W 10/16 |
| 2008/0097669 | A1 * | 4/2008 | Kasbarian | B62D 6/10 |
| | | | | 701/42 |
| 2011/0231052 | A1 * | 9/2011 | Ellis | B60W 30/10 |
| | | | | 701/31.4 |
| 2013/0151214 | A1 * | 6/2013 | Ryou | G05B 19/404 |
| | | | | 703/2 |
| 2013/0173113 | A1 * | 7/2013 | Takiguchi | B60K 26/021 |
| | | | | 701/36 |
| 2014/0088807 | A1 * | 3/2014 | Saito | B60W 10/06 |
| | | | | 701/22 |
| 2014/0244096 | A1 * | 8/2014 | An | G05D 1/0055 |
| | | | | 701/25 |
| 2015/0066306 | A1 * | 3/2015 | Kodera | B62D 5/0463 |
| | | | | 701/43 |
| 2015/0203116 | A1 * | 7/2015 | Fairgrieve | B60W 30/18172 |
| | | | | 701/93 |
| 2015/0217766 | A1 * | 8/2015 | Kelly | F16H 61/0213 |
| | | | | 701/94 |
| 2015/0217771 | A1 * | 8/2015 | Kelly | B60W 30/025 |
| | | | | 701/93 |
| 2016/0052543 | A1 * | 2/2016 | Weinreich | B62D 6/00 |
| | | | | 701/41 |
| 2016/0200317 | A1 * | 7/2016 | Danzl | B60W 10/10 |
| | | | | 701/25 |
| 2017/0057095 | A1 * | 3/2017 | Oestergaard | B25J 9/1674 |
| 2017/0151979 | A1 | 6/2017 | Maeda et al. | |
| 2017/0174219 | A1 * | 6/2017 | Omran | B60W 30/1882 |
| 2017/0282972 | A1 * | 10/2017 | Moretti | B60W 50/04 |
| 2017/0369095 | A1 * | 12/2017 | Kodera | B62D 5/0421 |
| 2019/0001490 | A1 * | 1/2019 | Washizu | B25J 9/1651 |
| 2019/0031229 | A1 * | 1/2019 | Sakaguchi | B62D 5/0421 |
| 2020/0031792 | A1 * | 1/2020 | Benson | C07D 307/00 |
| 2020/0094829 | A1 * | 3/2020 | Ohmura | B60W 40/04 |
| 2020/0108717 | A1 * | 4/2020 | Kim | B60W 30/146 |
| 2020/0133281 | A1 * | 4/2020 | Gomez Gutierrez | |
| | | | | G05D 1/0214 |
| 2020/0317192 | A1 * | 10/2020 | Awane | B60W 30/12 |
| 2020/0361529 | A1 * | 11/2020 | Moretti | B62D 5/0493 |
| 2020/0398836 | A1 * | 12/2020 | Wu | B60W 30/16 |

* cited by examiner

METHOD FOR OPTIMIZING A VEHICLE SPEED INDICATOR PARAMETER INTENDED FOR THE STEERING ASSISTANCE FUNCTIONS AND THE SAFETY FUNCTIONS

The present invention concerns the methods for managing power steering systems for vehicles.

It is known to embed in such steering systems on the one hand assist functions, which are intended to assist a driver in the piloting of the vehicle, either by providing an effort for assisting in the manual piloting, or by ensuring a real automatic piloting of the vehicle through a servo-control of the trajectory of said vehicle (for example for «park assist», or for «lane keeping»), and on the other hand safety functions, intended to confer to the system, and more particularly to the assist functions, a sufficient safety and reliability level.

To this end, the safety standard ISO-26262 suggests defining, from a risks analysis, «ASIL» (standing for «Automotive Safety Integrity Level») safety levels, denoted, from the lowest one to the most demanding one, «QM» (standing for «Quality Management», that is to say irrelevant for safety), then «A», «B», «C» and finally «D», and which are determined by characterizing each possible dangerous situation (or «dreaded event») by three parameters:

- its severity, that is to say the degree of seriousness of the injuries likely to be inflicted on the occupant of the vehicle (from S0 for no injuries to S3 for a critical or life-threatening injury);
- its exposure, that is to say the foreseeable frequency of occurrence of the operating conditions under which an injury is likely to happen (from an almost-zero probability E0, or very low E1, according to which the injury happens only under rare operating conditions, up to a high probability E4, in which it is almost certain that an injury would happen in most operating conditions), and
- its controllability, that is to say the probability that the driver, or the system, could act (or react) to control the situation and avoid the injury (from a generally controllable situation C0 to a difficult to control and even totally uncontrollable situation C3).

The ASIL level depends on the combination (the product) of these three parameters.

Thus, as example, a dangerous event causing critical injuries S3, with a high probability of occurrence E4, and uncontrollable C3, will pertain to the ASIL level D (the highest one).

However, the same event that is uncontrollable C3 and causing critical injuries S3, but having a lower probability of occurrence, lower by one or several degree(s) than the maximum degree, will have its ASIL level lowered by one or several degree(s) accordingly. In this example, the ASIL level, will thus be brought to C in the case of an E3 exposure, and even to A in the case of an E1 exposure.

In practice, the assist functions and the safety functions generally use, amongst their input data, an estimate of the instantaneous longitudinal speed of the vehicle.

Yet, during the so-called «dynamic» phases of longitudinal acceleration or longitudinal deceleration (braking) of the vehicle, the speed may sometimes be temporarily overestimated or underestimated.

In particular, this may be the case when the speed is estimated from the measured average rotational speed of the wheels and the estimation may therefore be falsified if some wheels are blocked or on the contrary skid and run away during such abrupt acceleration or abrupt braking phases.

As example, a strong pressure on the accelerator pedal may create a loss of adherence of the drive wheels, which start skidding and are therefore subjected to a considerable increase of the rotational speed thereof, yet without the actual speed of the vehicle increasing significantly. The actual speed of the vehicle will then be much lower than that estimated from the rotational speed of the wheels.

Conversely, if wheels slow down strongly or are blocked in an emergence braking situation and lose adherence, then the vehicle may slip on the road surface at an actual speed much higher than that estimated from the rotational speed of said wheels.

Definitely, an overestimation of the speed of the vehicle may be favorable to the safety functions, by enabling said safety functions to control the vehicle in a stricter manner, and in particular operate more responsive steering corrections, or restrict the amplitude of the steering maneuvers, which are potentially more dangerous at high speed than at low speed.

However, an over-estimation of the speed may also result in an inopportune reduction of the conventional drive assistance, or else a restriction of the return effort that is generated by the power steering for returning the steering wheel back into the central position after a turn (a function called «street corner return»), while the vehicle still circulates at a low actual speed, typically in town, and would therefore reduce the utility of such assist and steering wheel return functions. This will result in an inconvenience for the driver, who will feel some kind of heaviness in the steering wheel and the steering system.

Conversely, a random underestimation of the speed of the vehicle will favor assistance rather than maneuvering of the steering wheel, but may be detrimental to the reliability and to the responsiveness of the safety functions, and may therefore present a risk for the occupants of the vehicle.

One solution might consist in using two different assessments of the speed of the vehicle, from distinct origins, namely a first assessment for the assist functions, and the other assessment, possibly intentionally overestimated, for the safety functions, in order to guarantee both assistance comfort and safety of the different functions of the steering system at satisfactory ASIL levels.

Nonetheless, such a solution would require redundant equipment, in particular sensors and processing units, which would increase the cost and the bulk of the steering system.

Furthermore, and primarily, the use of distinct speed signals, without any correlation with one another, may in particular induce contradictory behaviors, called «interferences», of the respective assist and safety functions, if an overestimation or underestimation error affects one of the two speed signals and not the other one.

Consequently, the objects assigned to the invention aim at overcoming the aforementioned drawbacks and proposing a new method for managing a power steering system which allows managing, in a simple and reliable manner, the instantaneous speed information and the concomitant execution of the assist functions and the safety functions that depend from this instantaneous speed information.

The objects assigned to the invention are achieved by means of a method for managing a power steering system for a vehicle, said power steering system including a plurality of functions including at least one assist function intended to assist a driver in the piloting of the vehicle and at least one safety function intended to confer to said assist function a predetermined ASIL level within the meaning of the standard ISO-26262, each of said assist function and said safety function using the same indicating parameter of the speed of the vehicle which is considered as representative of the longitudinal speed of the vehicle, said method being characterized in that it comprises a step (a) of estimating a functional speed, during which is estimated a first speed value, called «functional speed», which is representative of the actual longitudinal speed of the vehicle at a considered time, and which is used by default as the indicating parameter of the speed of the vehicle, according to a first operating mode called «normal operating mode», a step (b) of estimating a speed upper limit, during which is estimated a second speed value, called «speed upper limit», which is higher than the functional speed and representative of an upper limit of the actual longitudinal speed of the vehicle at said considered time, a step (c) of calculating an underestimated speed during which a predetermined reduction law is applied to the speed upper limit so as to obtain an underestimated speed value, which is lower than the speed upper limit by a predetermined reduction value set by said reduction law, a comparison step (d) during which the functional speed value is compared, in absolute value, with the underestimated speed value and, if the absolute value of the functional speed is lower than the absolute value of the underestimated speed, a switching step (e) during which we switch from the normal operating mode into a second operating mode called «safety mode», by substituting the underestimated speed for the functional speed as the indicating parameter of the speed of the vehicle used at the input of each of the assist and safety functions.

Advantageously, such a method allows favoring the use, as an indicating parameter of the speed of the vehicle, the functional speed, which represents an estimate that is very close to the actual speed of the vehicle under normal conditions, and that in order to optimize the behavior of the assist function(s), and therefore in order to optimize the driving comfort, but provided that the value of the functional speed remains acceptable to guarantee the proper operation of the safety functions.

Otherwise, that is to say if the functional speed signal falls below an acceptable threshold, and thus becomes incompatible with the proper operation of the safety functions, then the method provides for a substitute signal, namely an underestimated speed signal, which is determined from a speed upper limit, naturally higher than the actual speed of the vehicle and therefore conducive to said safety functions.

In other words, the method allows defining, and recalculating in real-time, at all times, and irrespective of the actual speed of the vehicle, a «safety interval», which is comprised between a high value corresponding to the speed upper limit and a low value corresponding to the underestimated speed, and ensuring that the indicating parameter of the speed of the vehicle that is retained for the application of the assist and safety functions is permanently within said safety interval, so as to guarantee a reliable operation of the safety functions.

Thus, as long as the functional speed signal, which generally provides an accurate estimate of the actual instantaneous speed of the vehicle but which is intrinsically difficult to secure specifically because of the complexity of the estimation operation, remains inside this safety interval, said functional speed signal is used as an indicating parameter of the speed of the vehicle, in order to favor the accuracy and the comfort of the assist functions, yet without affecting the reliability of the safety functions.

However, should an error affects said functional speed signal such that said functional speed signal exits (by the bottom) the acceptable domain delimited by the safety interval, then this functional speed signal is replaced by the safe signal constituted by the underestimated speed, which correspond to an acceptable low limit of applicability of the safety functions. In this manner, the service continuity of said safety functions is ensured.

Thus, the method according to the invention allows automatically selecting the indicating signal of the speed of the vehicle that is the most appropriate to the situation at the considered time, while systematically guaranteeing the reliable operation of the safety functions.

Furthermore, the use of a unique and same underestimated speed information as an indicating parameter of the speed of the vehicle, that is to say a unique speed signal, common to the assist functions and to the safety functions, advantageously allows lightening the structure, both hardware and software, of the steering system, and reducing the cost of said system.

Other objects, features and advantages of the invention will appear in more details on reading the following description, as well as using the appended drawings, provided for purely illustrative and non-limiting purposes, amongst which.

The present invention concerns a method for managing a power steering system 1 for a vehicle.

Preferably, such a power steering system 1 comprises, in a manner known per se, a steering wheel, intended to be maneuvered by the driver of the vehicle, and which controls, preferably by means of a steering column provided with a pinion, the displacement of a steering mechanism allowing modifying the orientation of one or several steered wheels 2.

Preferably, said steering mechanism comprises a rack, which is mounted movable in translation within a steering casing fastened to the frame of the vehicle, on which the pinion meshes, and at the ends of which are fastened steering tie rods that allow modifying the yaw orientation, that is to say the steering angle, of steering knuckles carrying the wheels 2.

An assist motor, preferably electric, is also coupled to the steering mechanism to supply an assist effort, typically an assist torque, which facilitates the maneuvering of said steering mechanism and therefore the modification of the steering angle.

Moreover, the power steering system 1 includes a plurality of functions F1, F2, including at least one assist function F1 intended to assist a driver in the piloting of the vehicle and at least one safety function F2 intended to confer to said assist function a predetermined ASIL level within the meaning of the standard ISO-26262.

Preferably, the assist function F1 is selected from:
- a manual piloting assist function, intended to supply, by means of the assist motor, an assist effort to facilitate the displacement of the steering mechanism and/or of the steering wheel, said manual piloting assist function may in particular be a conventional assist function, intended to supply an assist effort allowing amplifying the manual effort supplied by the driver in order to help the driver turn the steering wheel, or else a return function intended to return the steering wheel into its central position, which corresponds to a straight line trajectory, after a turn;
- an automatic piloting function, carrying out an automatic servo-control of the trajectory of the vehicle, such as a lane keeping function, an automatic obstacle avoidance function, or a park assist function.

For example, the safety function F2, distinct from the assist function F1, may be designed so as to restrain, when the longitudinal speed of the vehicle increases and/or exceeds a specific threshold, the intensity of the assist effort determined by the assist function F1, and that in order to avoid the assist function F1 causing, in particular when the vehicle circulates at a high speed (typically beyond 50 km/h, 90 km/h or 120 km/h), abrupt movements of the steering which would be likely to cause a swerve of the vehicle at such speeds.

Preferably, the safety function F2 guarantees an ASIL level at least equal to B, preferably at least equal to C, and even equal to D within the meaning of the standard ISO-26262.

Thus, it is possible to meet the even more stricter requirements imposed by the entry into force of the standard ISO-26262 which henceforth prohibits the absence of an ASIL safety, that is to say which excludes the «Quality Management» level and imposes a higher ASIL level.

Figure 2:
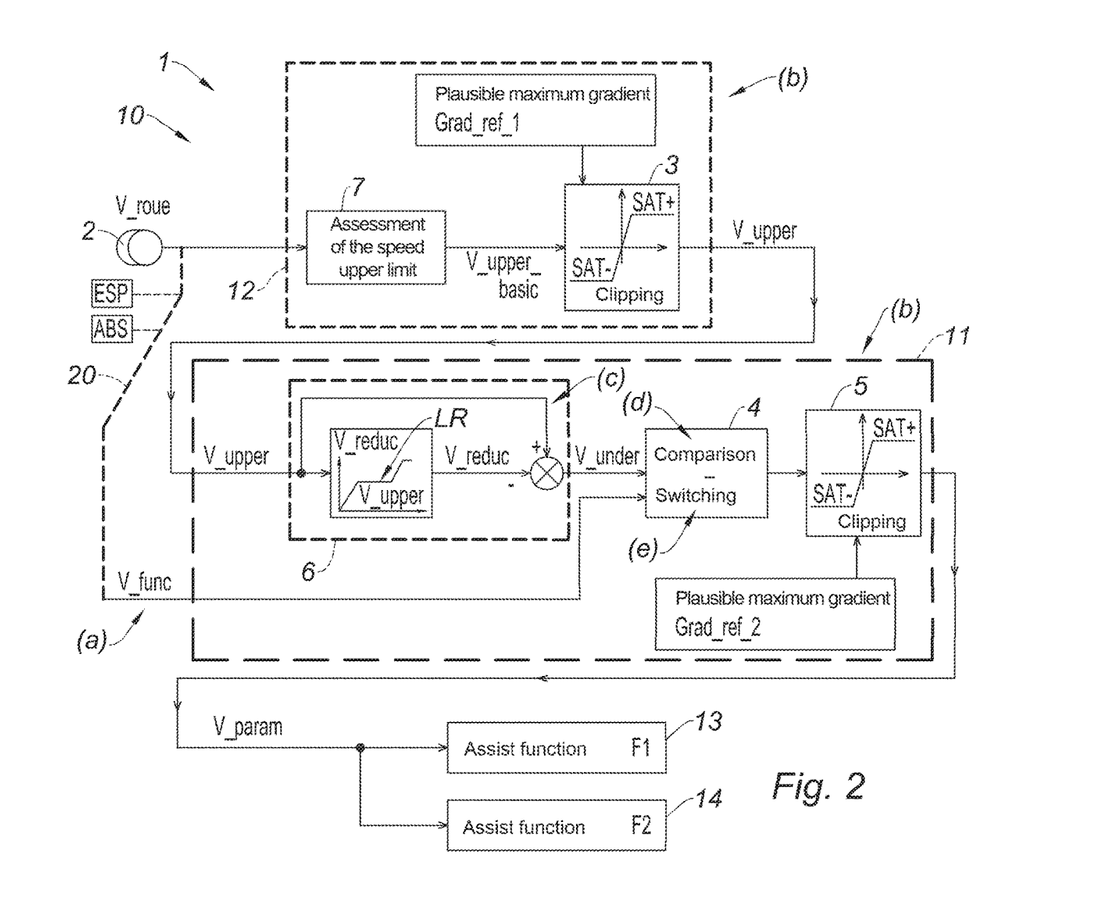
FIG. 2 illustrates, according to a block diagram, the operation principle of a method according to the invention within a power steering system.

Each of the assist function F1 and the safety function F2 uses the same indicating parameter of the speed of the vehicle V_param which is considered as representative of the longitudinal speed of the vehicle, as shown in FIG. 2.

In other words, each of said functions F1, F2 requires, for its own execution, the knowledge of a speed information, representative of the longitudinal speed of the vehicle, said speed information being herein supplied at the input of each of said functions F1, F2 in the form of a signal called «speed indicating parameter» V_param.

According to the invention, the method therefore comprises a step (a) of estimating a functional speed, during which is estimated a first speed value, called «functional speed» V_func, which is representative of the actual longitudinal speed of the vehicle at a considered time.

This functional speed V_func is used by default as the indicating parameter of the speed of the vehicle V_param, according to a first operating mode called «normal operating mode».

In practice, this functional speed V_func will be, in normal operation, that is to say in the absence of skidding of the wheels and in the absence of any hardware failure of a sensor or of a calculator in charge of estimating said functional speed V_func, equal to the actual speed of the vehicle within +/−10%, and even within +/−5%, that is to say it will have a very good accuracy.

Hence, this functional speed signal V_func will be ideal for the application of the assist functions F1.

However, the functional speed signal V_func may be relatively sensitive to the disturbances or to the deficiencies that affect the vehicle or the calculation of said signal, such that its (guaranteed) ASIL level might be low.

In particular, this functional speed V_func may have a tendency to be slightly underestimated, which, in some situations, cannot be acceptable for the safety functions F2.

According to a possible implementation, the functional speed information V_func may originate from a third-party system, which is embedded on the vehicle but which is distinct from the power steering system 1, such as for example an Electronic Stability Program or from an Anti-Blocking System. The functional speed V_func will then be part of the information available on the onboard network 20, of the CAN («Controller Area Network») or FlexRay (computer bus) type, and may be retrieved by the power steering system 1 during step (a).

According to another possible implementation, the estimation of the functional speed V_func may be carried out by the power steering system 1 itself, for example from measurements of the rotational speed V_roue of one or several wheel(s) 2 of the vehicle, as illustrated in FIG. 2.

For example, it is possible to consider as the functional speed V_func the average of the rotational speed of wheels 2 of the vehicle, typically the average of the rotational speed of two wheels 2 or of four wheels 2, converted into a linear speed by taking into account in particular the diameter of said wheels (including the tires).

More particularly, it is possible to consider the average of the rotational speed of the driven wheels of said vehicle (when the vehicle does not operate with an all-wheel transmission), in particular in order to limit the estimation errors related to possible losses of adherence of the drive wheels due to acceleration or braking.

Alternatively, it is of course possible to consider the average of the rotational speeds of all wheels, whether the drive and/or driven wheels, of the vehicle.

According to the invention, the method also comprises a step (b) of estimating a speed upper limit, during which is estimated a second speed value, called «speed upper limit» V_upper, which is distinct from, and higher than, the functional speed V_func and which is representative of an upper limit of the actual longitudinal speed of the vehicle at said considered time.

This speed upper limit V_upper represents an upper boundary of the speed, that is to say a longitudinal speed value that is known that it cannot be lower than the value of the actual longitudinal speed of the vehicle at the considered time.

In other words, the speed upper limit V_upper is assessed such that it is ensured, given the service situation of the vehicle, that, physically, at the considered time, the actual longitudinal speed of the vehicle is at most equal to, and potentially lower than, said estimated speed upper limit V_upper, such that it is therefore impossible that the vehicle effectively runs faster than this speed upper limit value V_upper.

For indication, the speed upper limit V_upper will preferably be higher (in absolute value) than the actual longitudinal speed of the vehicle by a value comprised between 0 km/h and 30 km/h.

Furthermore, the speed upper limit signal V_upper will be intrinsically «safe», as it will have an ASIL level higher than that of the functional speed signal V_func.

In the same manner as with the functional speed information V_func, the speed upper limit information V_upper can be retrieved on the onboard network 20, originating from third-party embedded systems such as the ESP or the ABS, or be determined by the power steering system 1 itself.

In this respect, it is possible for example to assess the speed upper limit V_upper from the maximum rotational speed V_roue observed amongst the set of each of the rotational speeds of the drive wheels 2 of the vehicle.

Thus, a «high» estimate, and even an overestimation, of the actual instantaneous speed of the vehicle is preferred, and that in order to have a speed upper limit V_upper that will eliminate any risk of using as a speed indicating parameter V_param a value that is underestimated too much which might falsify the execution of the safety function F2.

In this respect, it should be noted that taking into consideration the maximum rotational speed V_roue of the wheel 2 that rotates the fastest, and basing the estimate of the speed upper limit V_upper on said maximum rotational speed of the wheel, allows ensuring that such an upper limit is effectively determined.

Afterwards, the method comprises a step (c) of calculating an underestimated speed during which a predetermined reduction law LR is applied to the speed upper limit V_upper so as to obtain an underestimated speed value V_under, which is lower than the speed upper limit V_upper by a predetermined reduction value V_reduc set by said reduction law LR:

$$|V\_under|=|V\_upper|-|V\_reduc|.$$

It should be noted that the concept of «reduction», or «underestimation» of the speed of the vehicle consists in lowering, in absolute value, the speed upper limit V_upper initially estimated to obtain an underestimated speed V_under which is, in absolute value, closer to zero (closer to a zero speed) than said speed upper limit V_under.

Figure 3:
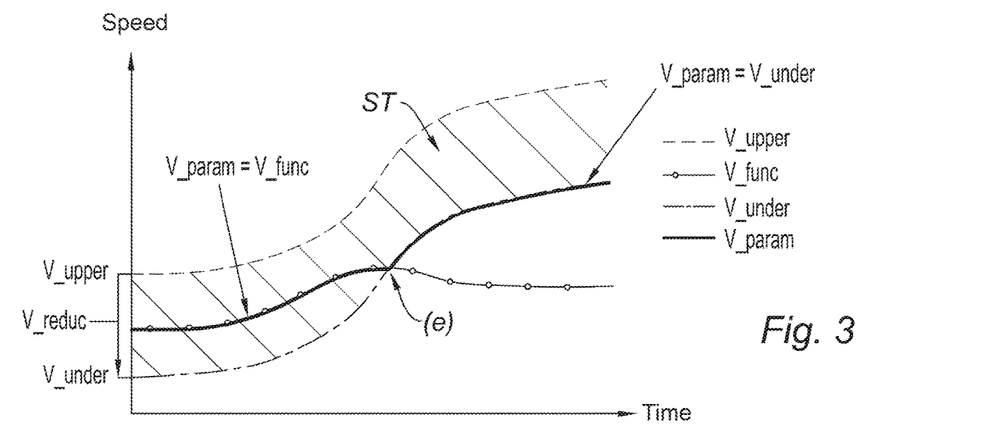
FIG. 3 illustrates, by means of a graph representing an evolution over time of the different speed signals used by the method, an instantaneous switching from the normal operating mode into the safety mode.
Figure 4:
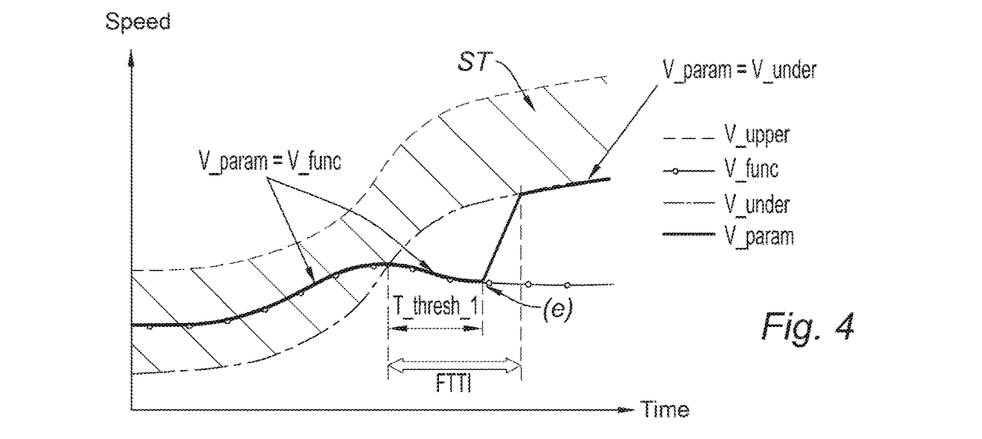
FIG. 4 illustrates, by means of a graph representing an evolution over time of the different speed signals used by the method, a delayed switching from the normal operating mode into the safety mode.

As will be detailed hereinbelow, and as illustrated in FIGS. 3 and 4, the reduction value V_under is selected such that it defines, with respect to the speed upper limit V_upper, the width of a «safety interval» ST, which is comprised between a high value corresponding to the speed upper limit V_upper and a low value corresponding to the underestimated speed V_under, and where said underestimated speed corresponds to an acceptable minimum value for guaranteeing the proper operation of the safety function F2.

The reduction value (underestimation value) V_reduc that results from the application of the reduction law LR is advantageously sufficient to enable, and even favor, a proper execution of the assist function F1, so as not to be a source of discomfort for the driver, but nevertheless small enough to not reduce too much the speed estimate used as an indicating parameter of the speed of the vehicle V_param, and therefore not to compromise the reliable execution of the safety function F2, and therefore guarantee that said safety function F2 and the power steering system 1 operate at the desired ASIL level.

Thus, as long as the value taken by the indicating parameter of the speed of the vehicle V_param retained for the application of the assist F1 and safety F2 functions will be within said safety interval ST, an acceptable operation of both types of functions, and in particular an acceptable operation of the safety function F2, will be guaranteed.

Afterwards, the method comprises a comparison step (d) during which the functional speed value V_func is compared, in absolute value, with the underestimated speed value V_under, and, if the absolute value of the functional speed |V_func] is lower than the absolute value of the underestimated speed |V_under], a switching step (e) during which we switch from the normal operating mode into a second operating mode called «safety mode», by substituting the underestimated speed V_under for the functional speed V_func as the indicating parameter of the speed of the vehicle V_param used at the input of each of the assist F1 and safety F2 functions.

This corrective switching allows selectively assigning to the indicating parameter of the speed of the vehicle V_param sometimes the functional speed value V_func, as long as said functional speed value is, in absolute value, higher than or equal to the underestimated speed V_under, that is to say as long as said functional speed value remains within the safety interval ST acceptable for the safety function F2, and sometimes the underestimated speed value, that is to say the acceptable low limit of the safety interval ST, when the value of the functional speed falls below said acceptable low limit V_under.

Thus, the indicating parameter of the speed of the vehicle V_param is permanently (or almost permanently) held above the low lower limit V_under of the safety interval, which guarantees the proper operation of the safety function F2.

Furthermore, the switching intervenes only when the functional speed V_func is too low and falls below the lower limit set by underestimated speed V_under, that is to say only in the event of an estimation error or deficiency, so as to prefer, in the absence of error or deficiency, the functional speed signal V_func which provides a more accurate and more realistic estimate of the actual longitudinal speed of the vehicle than the speed upper limit V_upper and/or the underestimated speed V_under, and that so as to favor, in normal operation, the reliability and the comfort of the assist function F1.

By default, that is to say as long as the functional speed V_func is within the safety interval ST, or respectively when the functional speed V_func returns into the safety interval ST, we remain, respectively we toggle again, in the normal operating mode.

Of course, the method also comprises a shared use step during which the same indicating parameter of the speed of the vehicle V_param, equal either to the functional speed V_func, or to the underestimated speed value V_under, is used as the input of each of the aforementioned assist F1 and safety F2 functions.

Preferably, the reduction law LR is established beforehand, through tests and/or simulations during which, at a given non-zero actual longitudinal speed of the vehicle, the indicating parameter of the speed of the vehicle V_param that is taken into consideration by the assist F1 and safety F2 functions is progressively, and artificially, lowered, in absolute value, and the corresponding reactions of the safety function F2 and/or of the vehicle are observed, until identifying a low threshold of the speed indicating parameter V_param_thresh_low from which it is noticed that the safety function F2 is no longer able to ensure safety in compliance with the desired ASIL level at the given actual longitudinal speed, then, a reduction value V_reduc retained for the reduction law LR is set, from this lower threshold of the speed indicating parameter V_param_thresh_low.

More particularly, it is possible to determine the reduction value V_reduc from the difference, called «acceptable maximum reduction value» V_reduc_max, between on the one hand the functional speed V_func, or more preferably the speed upper limit V_upper, at the tome where the low threshold of the speed indicating parameter V_param_thresh_low is reached, and on the other hand said low threshold of the speed indicating parameter V_param_thresh_low, that is to say:

$$V\_reduc = f(V\_reduc\_max)$$

with |V_reduc_max|=|V_func|−|V_param_thresh_low|
or, possibly,
with |V_reduc_max|=|V_upper|−|V_param_thresh_low|

It should be noted that, in practice, it is possible to carry out the tests intended to determine the reduction law LR under stabilized conditions, in which it is possible to have confidence in the functional speed value V_func. Hence, it is possible to serenely use the first formula hereinabove:

$$|V\_reduc\_max| = |V\_func| - |V\_param\_thresh\_low|$$

That being so, under stabilized conditions, the functional speed value V_func is generally very close to the speed upper limit V_upper, such that both methods (corresponding to each of the two formulas set out hereinabove) give substantially identical results, in a first approximation.

Afterwards, it is possible to select $$V\_reduc = V\_reduc\_max,$$

or, preferably, in order to keep an additional safety margin, define the reduction value V_reduc as a fraction of the acceptable maximum reduction value V_reduc_max, for example:

$$0.70 * |V\_reduc\_max| \leq |V\_reduc| \leq |V\_reduc\_max|.$$

said fraction being even more preferably comprised (in absolute value) between 70% and 90% of the acceptable maximum reduction value V_reduc_max:

$$0.70 * |V\_reduc\_max| \leq |V\_reduc| \leq 0.90 * |V\_reduc\_max|.$$

In other words, the reduction law LR is empirically built by making the power steering system 1, and more generally the vehicle, operate at a given actual speed, and therefore at a given speed upper limit V_upper, and by successively testing several decreasing values of the speed indicating parameter V_param (in absolute value), that is to say by intentionally falsifying the speed indicating parameter V_param, in order to simulate increasing defects in the estimate of the functional speed V_func which, in the absence of a corrective switching specific to the invention, would induce an even more considerable underestimation of said functional speed V_func and therefore of the indicating parameter V_param, until reaching a low threshold of the speed indicating parameter V_param_thresh_low which causes a deficiency of the safety function F2, for example by making the safety function ineffective or unable to compensate on time a dangerous event (dreaded event).

Thus, for each actual longitudinal speed, and therefore for each corresponding speed upper limit V_upper, an acceptable maximum reduction value V_reduc_max is identified from which, if said acceptable maximum reduction value V_reduc_max is deducted from said speed upper limit V_upper, to calculate the speed indicating parameter V_param used by the safety function F2, the induced defect degrades the performance of the safety function F2 enough for said function being «downgraded» to an ASIL level lower than the ASIL level required by the specifications.

The low threshold of the speed indicating parameter V_param_thresh_low, that is to say the underestimation limit that causes the deficiency of the safety function F2, therefore empirically corresponds to the acceptable maximum reduction value that should not be exceeded (in absolute value), at a given speed upper limit V_upper, and therefore in practice when operating at a given actual speed, to preserve a reliable safety at the desired ASIL level.

The test is repeated for several (increasing) values of the actual longitudinal speed of the vehicle, and therefore for several values of the speed upper limit V_upper (respectively for several functional speed values V_func), so as to preferably cover the entire predictable operating range of the vehicle, typically from 0 km/h to at least 130 km/h, 150 km/h, 200 km/h or 250 km/h.

The entirety of the data series that associates to each actual speed value, or, more preferably, to each speed upper limit value V_upper, in the aforementioned speeds range (herein from 0 km/h to 250 km/h in FIG. 1), an (acceptable maximum) reduction value V_reduc, and therefore an acceptable minimum (the lowest acceptable value, in absolute value) of the underestimated speed V_under, forms the reduction law LR.

Hence, the speed indicating parameter V_param may take on, without any risk for the safety function F2, any value that will be comprised within the defined range between on the one hand a high limit value equal to the speed upper limit V_upper, and on the other hand, and primarily, a low limit value equal to the underestimated speed V_under, that is to say equal to the speed upper limit V_upper (considered at the considered time) minus the reduction value V_reduc applicable at the considered time.

In absolute terms, it is possible to consider, according to one embodiment, using the same constant reduction value V_reduc irrespective of the instantaneous actual speed, and therefore irrespective of the value of the speed upper limit V_upper.

In particular, it is possible to use such a constant reduction value V_reduc as a retrofit within old generation power steering systems 1, whose safety functions F2 are relatively barely sensitive to the speed underestimate.

As example, said constant reduction value V_reduc may then be equal to a constant value selected within the range comprised between 30 km/h and 40 km/h.

Nonetheless, according to another particularly preferred embodiment, the reduction law LR adjusts the reduction value V_reduc according to the estimated speed upper limit V_upper.

Advantageously, the modification of the reduction value V_reduc according to the speed allows for a particularly fine use of the underestimation principle according to the invention, which allows in particular applying the method to new generation safety functions F2, which are more efficient but more demanding, as they are more sensitive to the speed underestimation defects than the previous generation safety functions.

Hence, safety of the vehicle and of its occupants is thereby improved.

Figure 1:
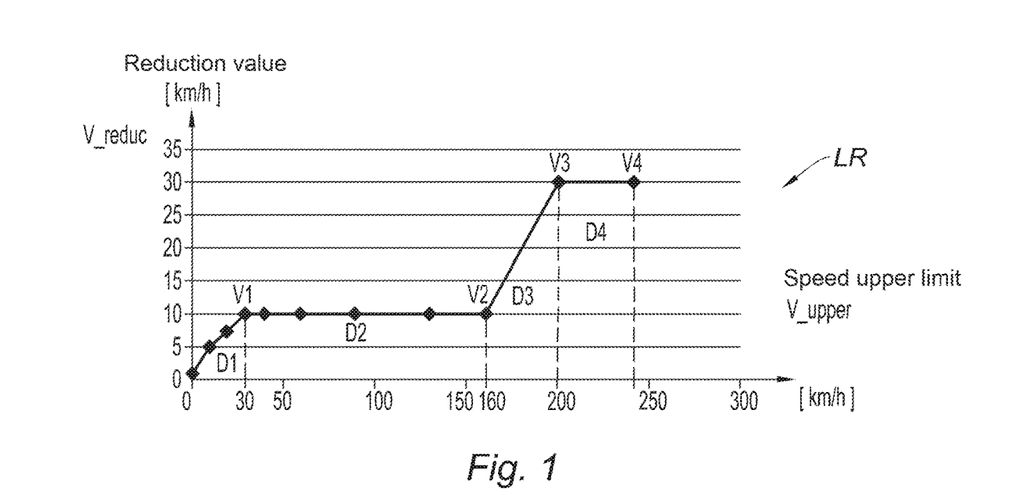
FIG. 1 illustrates a reduction law in accordance with the invention.

Even more preferably, the reduction law LR is generally an increasing function, so as to increase, in absolute value, the reduction value V_reduc when the speed upper limit V_upper increases in absolute value, as illustrated in FIG. 1.

Thus, it is possible to further underestimate the speed of the vehicle when the vehicle runs at high speeds than when the vehicle runs at low speed, or, said otherwise, it is possible to apply at low speed an underestimate (reduction value V_reduc) which is lower than the underestimate applied at high speed.

It should be noted that the evolution pattern of the reduction value V_reduc that is suggested in FIG. 1 is only a variant amongst others, said evolution being mainly defined according to the behavior of the concerned safety function(s) F2.

In the example of FIG. 1, the safety functions F2 may behave quite differently between a parking situation (or a very low speed situation, typically lower than 10 km/h and even lower than 5 km/h, in which said safety functions F2 are relatively «loose» and barely constraining, and a start of running situation (typically between 5 km/h and 30 km/h), in which said safety functions F2 become more constraining and therefore more sensitive to the variations of the speed indicating parameter V_param.

In order to avoid large discrepancies in the behavior of said safety functions F2 at low speed, the acceptable reduction value V_reduc is therefore decreased when the speed of the vehicle gets close to zero.

Afterwards, typically between 30 km/h and 160 km/h, the behavior of the safety functions F2 preferably evolves in a more progressive manner, which explains why it is possible to expect an almost constant reduction value V_reduc.

For very high speeds (beyond 160 km/h, and even beyond 200 km/h), the behavior, and in particular the triggering thresholds, of the safety functions F2 preferably almost no longer evolve, which explains why it is possible to tolerate a quite considerable underestimation of the speed, and therefore relatively high reduction values V_reduc.

In this manner, the possible underestimation of the speed indicating parameter V_param does not falsify the perception, by the power steering system 1, of the actual speed of the vehicle, and an execution of the functions, both the assist function F1 and the safety function F2, perfectly adapted to the actual speed of the vehicle, is therefore preserved.

Advantageously, the reduction value V_reduc will be selected, on the one hand, so as to adapt the sensitivity of the safety functions F2, in order to avoid an erratic behavior of the latter, but also, on the other hand, such that, when the indicating parameter of the speed of the vehicle V_param switches into the underestimated value V_under while the vehicle circulate at low speed, not deactivate or not restrain too much some assist functions F1 that are particularly useful when the vehicle circulates at low speed in urban areas, and in particular when the vehicle follow lanes featuring intersections and tight turns (such as «street corners»).

More particularly, it is thus possible to preserve, for example, despite the switch into the safe mode, a center return assist function of the steering wheel which remains effectively active over the entirety of the concerned actual speed range, herein preferably comprised between 0 km/h and 50 km/h, and consequently which remains active as long as the vehicle circulates in town and requires large maneuvers of the steering wheel to turn on street corners.

According to a purely indicative and non-limiting implementation, the reduction law LR may comprise several domains, as illustrated in FIG. 1:

- a first low speed domain D1, comprised between 0 km/h and a low speed limit V1 comprised between 20 km/h and 50 km/h, and preferably equal to 30 km/h, this domain D1 thus corresponding to the situations of accessing a parking and circulating in town. In said first domain D1, the reduction law LR will preferably be continuously increasing, so as to progressively increase the applicable reduction value V_reduc with the speed upper limit V_upper; the applicable reduction value V_reduc may be typically comprised between 0 km/h and 8 km/h to 10 km/h (value reached at the speed limit V1);
- a second medium speed domain D2, comprised between the aforementioned low speed limit V1 (30 km/h in FIG. 1) and a high speed limit V2 preferably comprised between 130 km/h and 180 km/h, and for example equal to 160 km/h in FIG. 1, said second domain D2 thus typically corresponding to the circulation outside urban areas and on highways. In this second domain D2, the reduction value V_reduc will follow a substantially flat pattern, and will therefore be preferably constant, or slightly increasing, and for example comprised between 8 km/h to 10 km/h and 15 km/h, or equal to 10 km/h;
- a third high speed domain D3, comprised between the aforementioned high speed limit V2 (160 km/h in FIG. 1) and a very high speed limit V3 preferably comprised between 180 km/h and 250 km/h, and for example equal to 200 km/h in FIG. 1, in which third domain D3 the reduction value V_reduc continuously increases with the speed upper limit V_upper, according to a function that is preferably increasing more significantly than in the first domain D1, to reach a value comprised between 20 km/h or 25 km/h and 40 km/h, and for example herein equal to 30 km/h;
- possibly, a fourth very high speed domain D4, comprised between the aforementioned very high speed limit V3 (200 km/h in FIG. 1) and the maximum speed V4 of the vehicle (for example 240 km/h or 250 km/h), in which the underestimation will preferably be constant, or slightly increasing, for example herein equal to 30 km/h.

Of course, the reduction law LR may adopt a very different pattern depending on the nature of the concerned safety functions F2.

Preferably, the reduction law LR is stored in a non-volatile memory in the form of a predetermined abacus which, as illustrated in FIG. 1, associates to each speed upper limit value V_upper a reduction value V_reduc that is subtracted afterwards from the speed upper limit V_upper to obtain the underestimated speed V_under as illustrated in FIG. 2.

According to a variant that is equivalent in its ultimate end, the reduction law LR may be stored in a non-volatile memory in the form of an abacus which directly associates to each speed upper limit value V_upper an underestimated speed value V_under that (implicitly) takes into consideration the reduction value V_reduc applicable to the considered speed upper limit V_upper Preferably, during step (b) of estimating a speed upper limit, at a considered time t_n corresponding to a current iteration n, the speed upper limit V_upper(t_n) is assessed from at least one input speed measurement V_roue, such as a measurement of the rotational speed V_roue of a wheel 2 of the vehicle, and more preferably from the maximum rotational speed amongst the speeds of several wheels or of all wheels of the vehicle, and then, according to a preferred feature that may constitute an invention on its own, said speed upper limit V_upper(t_n) is compared with the speed upper limit V_upper(t_n−1) that has been assessed during the previous iteration n−1 (at a time t_n−1), in order to assess the corresponding variation of the speed upper limit V_upper per unit of time, or, respectively, the input speed measurement of the current iteration V_roue(t_n) is compared with the input speed measurement of the previous iteration V_roue(t_n−1) in order to assess the corresponding variation of the input speed measurement per unit of time, said variation of the speed upper limit V_upper per unit of time, respectively said variation of the input speed measurement per unit of time, being called «observed speed gradient» denoted Grad(V).

Afterwards, said observed speed gradient Grad(V) is compared with a first reference gradient called first «plausible maximum gradient» Grad_ref_1, predetermined beforehand through acceleration and braking tests of the vehicle, and, if the observed speed gradient Grad(V) is higher, in absolute value, than said first plausible maximum gradient Grad_ref_1, the speed upper limit of the current iteration V_upper(t_n) is corrected by clipping, by applying to the speed upper limit of the previous iteration V_upper(t_n−1), or respectively to the input speed measurement of the previous iteration V_roue(t_n−1), the first plausible maximum gradient Grad_ref_1 instead of the observed speed gradient Grad(V).

In other words:

The instantaneous speed variation per unit of time is calculated:

$$\text{Grad}(V)=[V\_upper(t\_n)-V\_upper(t\_n-1)]/[(t\_n)-(t\_n-1)]$$

or, in an equivalent manner, the input speed variation per unit of time:

$$\text{Grad}(V)=[V\_roue(t\_n)-V\_roue(t\_n-1)]/[(t\_n)-(t\_n-1)]$$

Afterwards, Grad(V) is compared with Grad_ref_1.

Concretely, the plausible maximum gradient Grad_ref_1 represents the maximum acceleration, or respectively the maximum deceleration, that the vehicle can physically achieve, in particular given the power of the engine in charge of propelling the vehicle, the effectiveness of the brake system, and the adherence of the tires.

These maximum acceleration, respectively maximum deceleration, capabilities are empirically determined through acceleration tests and deceleration (for example emergency braking) tests conducted on the vehicle, during which the vehicle is pushed to its adherence limits in an acceleration/deceleration situation.

Where appropriate, tests conducted on a vehicle allow establishing a general plausible maximum gradient, which will be applicable to all vehicles of the same model having the same configuration.

If the observed speed gradient Grad(V) is higher, in absolute value, than the plausible speed maximum gradient, that is to say if |Grad(V)|>|Grad_ref_1|, this means that the measured variation of the speed of the vehicle, that is to say the measured acceleration, or respectively the measured deceleration, of the vehicle, represented by Grad(V), is higher than the maximum acceleration, respectively higher than the maximum braking, that the vehicle could physically provide, which is of course impossible.

Hence, it is concluded that the estimate of the speed upper limit V_upper is erroneous, in this instance overrated in the case of an acceleration, underrated in the case of a braking. In particular, this error situation may happen when a wheel loses adherence and is, as the case may be, strongly accelerated by skidding on the road surface, or braked until blockage and slipping on the road surface.

In such a situation, it is then decided to substitute the plausible maximum gradient Grad_ref_1 for the observed gradient Grad(V), so as to replace the erroneous speed upper limit V_upper(t_n), estimated during the current iteration n, by a more plausible calculated speed upper limit V_upper, that is to say which corresponds in a more realistic manner to the possible actual performances of the vehicle, and which is obtained by adding to the previous speed upper limit value V_upper(t_n−1), measured during the previous iteration n−1 and deemed to be reliable, the plausible maximum gradient Grad_ref_1 multiplied by the elapsed duration between the two iterations:

$$V\_upper(t\_n)=V\_upper(t\_n-1)+\text{Grad\_ref\_1}*[(t\_n)-(t\_n-1)]$$

In other words, if the estimated (or collected via the onboard CAN network) speed upper limit V_upper during the current iteration t_n is not realistic, for incompatibility with the performances of the vehicle, it is arbitrarily considered that the instantaneous speed, and therefore the speed upper limit V_upper, has varied, with respect to the instantaneous speed, respectively with respect to the speed upper limit V_upper, assessed during the previous iteration, at most only by a value equal to that defined by the maximum acceleration capability, or respectively by the maximum deceleration capability, of the vehicle.

Thus, it is ensured that the considered speed upper limit V_upper for applying the method, and more particularly for implementing the underestimated speed V_under calculation (c), and the comparison (d) and then, where appropriate, the switching (e) steps, remain always coherent with the material capabilities of the vehicle, either by directly using the estimate of said speed upper limit V_upper, if said estimate is compliant with the variation limit set by the possible maximum gradient Grad_ref_1, or, if such is not the case, by recalculating said speed upper limit V_upper within the variation limit set by the plausible maximum gradient Grad_ref_1, to make said speed upper limit V_upper compliant with said limit, and therefore coherent with the effective capabilities of the vehicle.

In practice, clipping amounts to applying a (first) gradient limiter 3, whose saturation value SAT+, SAT− corresponds to the plausible maximum gradient Grad_ref_1.

Such a gradient limiter 3 will let pass unaltered any variation of the speed upper limit V_upper that is lower than or equal to the plausible maximum gradient Grad_ref_1, that is to say which is comprised between a zero value and the saturation value SAT+, SAT− (clipping value) defined by said plausible maximum gradient, and which is therefore compliant with the effective acceleration/deceleration capabilities of the vehicle.

However, this gradient limiter 3 will automatically limit any variation of the speed upper limit V_upper that exceeds said plausible maximum gradient Grad_ref_1, that is to say which exceeds, in absolute value, the absolute value of the corresponding saturation value SAT+, SAT−, by bringing (saturating) said variation of the speed upper limit to said plausible maximum gradient value, that is to say to the saturation value SAT+, SAT−.

It should be noted that, advantageously, the gradient limiter 3 may include an acceleration saturation value SAT+ which is distinct, in absolute value, from the deceleration (braking) saturation value SAT−, that is to say operate a saturation that is not symmetrical whether in an acceleration situation (a positive variation of the speed, and therefore a positive variation of the speed upper limit) or in a deceleration situation (a negative variation of the speed, and therefore a negative variation of the speed upper limit).

In particular, such a differentiation will allow taking into account the fact that, physically, a vehicle can generally decelerate, in particular in an emergency braking situation, with more intensity than it could accelerate.

Preferably, the (first) plausible maximum gradient Grad_ref_1, and therefore the gradient limiter 3, may thus set an acceleration saturation value SAT+ that is lower, in absolute value, than the deceleration saturation value SAT−, that is to say such that |SAT+|<|SAT−|.

As example, it is possible to define an acceleration saturation value in the range of +10 km/h/second, and a deceleration saturation value SAT− in the range of −36 km/h/second.

Conventionally, the positive and negative signs herein correspond to an acceleration and to a deceleration, respectively.

Advantageously, this saturation of the speed gradient operated by the gradient limiter 3 allows avoiding committing a gross error of estimating the speed upper limit V_upper when the method for estimating the longitudinal speed of the vehicle, and more particularly the method for estimating the speed upper limit, is defective or inapplicable, as is the case for example during the runaway or the blockage of a wheel 2 following a loss of adherence.

It should also be noted that the saturation operated by the first gradient limiter 3 may intervene differently, in an equivalent manner, either upstreams, at the source, that is to say on the input speed measurement signals (herein the signals representative of the respective rotational speeds of the wheels) V_roue, or downstreams, on the result of the «raw» estimate of the speed upper limit V_upper_basic which is derived from the speed calculation performed from these input speed measurement signals V_roue, as illustrated in FIG. 2.

Alternatively, the saturation operated by the first gradient limiter 3 may intervene downstreams on an estimate of the speed upper limit V_upper which is derived from the recovery of an instantaneous speed signal available on the onboard network 20.

According to a possible implementation of the invention, the switching step (e) may operate an immediate switching from the normal operating mode into the safety mode, by immediately making the speed indicating parameter V_param pass from the functional speed V_func into the underestimated speed V_under, as soon as it is detected that, in absolute value, the functional speed V_func becomes lower than the underestimated speed V_under.

Figure 5A:
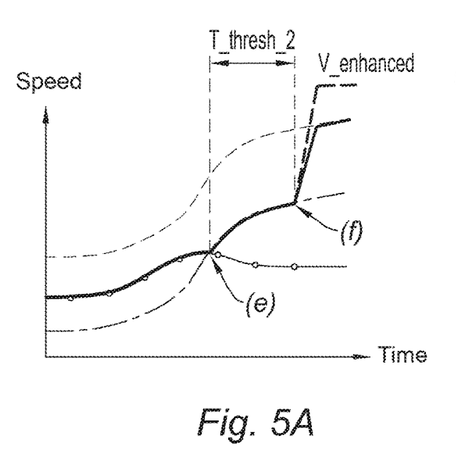
FIGS. 5A and 5B illustrate, by means of graphs representing an evolution over time of the different speed signals used by the method, the implementation of a switching from the safety mode into an enhanced safety mode, respectively after a first instantaneous switching according to FIG. 3 and after a first delayed switching according to FIG. 4.

Graphically, this amounts to proceeding with the switching at the point of intersection of the respective curves of the functional speed V_func and of the underestimated speed V_under, as illustrated in FIGS. 3 and 5A.

Advantageously, such an instantaneous siwtching always allows complying with the acceptable limit for the safety functions F2, because the indicating parameter V_param resulting therefrom is never lower than the underestimated speed V_under, and that while nevertheless remaining close to the functional speed V_func, favorable for the assist functions F1, within the acceptable safety limit.

Hence, this immediate switching solution may represent a good tradeoff for the assist F1 and safety F2 functions.

Figure 5B:
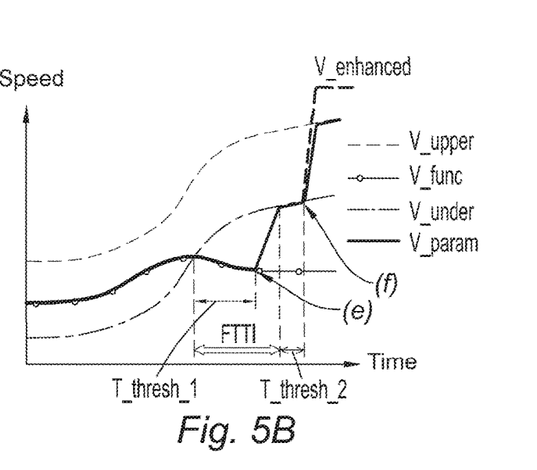

According to another possible implementation, illustrated in FIGS. 4 and 5B, the switching step (e) may operate a delayed switching from the normal operating mode into the safety mode, by making the speed indicating parameter V_param pass from the functional speed V_func into the underestimated speed V_under only if the functional speed V_func (continuously) remains lower, in absolute value, than the underestimated speed V_under for a non-zero duration, called «defect duration», which reaches or exceeds a predetermined tolerance threshold T_thresh_1.

In other words, it is thus possible to temporarily let the speed indicating parameter V_param follow the functional speed V_func, for a duration T_thresh_1, although said functional speed V_func has temporarily fallen below the underestimated speed V_under.

Advantageously, the tolerance threshold T_thresh_1 allows delaying the triggering of the switch, and thus performing a switch only in a situation of a durable and significant defect, that is to say only if it is really appropriate to carry out an adjustment of the speed indicating parameter V_param.

Thus, we avoid unnecessarily reacting to very brief and insignificant variations of the speed upper limit V_upper, which may possibly result from noise or assessment transitional errors due to falsified measurements.

Furthermore, by temporarily holding the normal operating mode, without immediately triggering the safety mode, in the event of temporary defects that do not compromise the safety of the vehicle, it is possible to advantageously favor the assist functions F1, and therefore the driving comfort.

The defect duration will be monitored by an appropriate timing, triggered when it is detected that the functional speed V_func falls below the underestimated speed V_under, in order to be able to activate the safety mode if the defect persists over time beyond the appropriate tolerance threshold T_thresh_1.

Said timing will be reset to zero if the functional speed V_func returns to a value equal to or higher than the underestimated speed V_under.

The tolerance threshold T_thresh_1 will be determined according to the Fault Tolerance Time Interval «FTTI», which represents the maximum duration, specified by the specifications, that is authorized between the occurrence of a defect (dangerous situation) and the time of said defect, and its consequences, are mastered and corrected by the power steering system 1.

More particularly, the tolerance threshold T_thresh_1 will be selected strictly smaller than the FTTI, in particular so as to be able to include within the FTTI interval the duration necessary to operate the transition between the functional speed V_func and the underestimated speed V_under.

As example, the FTTI may be comprised between 20 ms (twenty milliseconds) when it is associated to a very dangerous defect, threatening the safety of the occupants of the vehicle, and more than 1 s (one second) when it concerns a defect that is of low concern to safety.

Moreover, it should be noted that the refresh period of the functional speed V_func, of the speed upper limit V_upper, and more generally of the speed indicating parameter V_param, that is to say the duration separating two successive iterations, n−1, n of the method, is preferably substantially comprised between 5 ms (five milliseconds) and 10 ms (ten milliseconds), whereas the characteristic response time (typically the response time at 5%) of the steering mechanism, and more generally of the vehicle, in response to a change in the assist setpoint, will generally be equal to or longer than 100 ms (one hundred milliseconds), 300 ms (three hundred milliseconds), and even in the range of several seconds.

According to a preferred variant of the invention, illustrated in FIGS. 5A and 5B, the method may include, after the switching step (e), an enhanced safety step (f), during which the duration, called «safety duration», during which the safety mode remains active, is measured, and, if said safety duration reaches or exceeds a predetermined warning threshold T_thresh_2, we switch from the safety mode into a third operating mode, called enhanced safety mode, by making the indicating parameter of the speed of the vehicle V_param pass from the underestimated speed V_under into a value called «enhanced safety speed» V_enhanced which is equal to or higher than the speed upper limit V_upper.

Advantageously, this variant allows diagnosing a situation in which the defect, that is to say the fact that the functional speed V_func is (and remains) lower than the underestimated speed V_under, lasts too long for said defect simply originating from a temporary specific service situation, for example a situation of skidding of the wheels 2 in the acceleration phase.

In such a situation, there are therefore good reasons to assume that the defect is the expression of a durable deficiency of one or several system(s) or sensor(s) of the vehicle.

That is why the enhanced safety mode is then activated, in order to absolutely prioritize the safety functions F2, irrespective of the actual speed of the vehicle.

For this reason, the indicating parameter of the speed of the vehicle V_param is forced to an enhanced safety speed value V_enhanced, possibly equal to the speed upper limit V_upper applicable at the considered time (as represented in a continuous line in FIGS. 5A and 5B), or, preferably, equal to a forcing value higher than all possible upper limits for the vehicle (as illustrated in a dotted line in FIGS. 5A and 5B), and therefore typically equal to or higher than the possible maximum actual speed of the vehicle, so as to guarantee the effectiveness of the safety functions F2 irrespective of the actual speed of the vehicle.

Preferably, the modifications of the value of the indicating parameter of the speed of the vehicle V_param, which are operated during the switchings from one operating mode into another operating mode, and more particularly during the step (e) of switching from the normal operating mode into the safety mode and/or during the enhanced safety step (f), follow transition laws having a differentiability class of at least C0, such as a ramp, an interpolation (in particular polynomial) function or a filtering, as shown in FIGS. 4 and 5B.

Such gentle transitions will allow ensuring the continuity (at least $C^0$) of the signal of the indicating parameter of the speed of the vehicle V_param, and thus avoiding jerky reactions of the steering system, and in particular avoiding jolts in the power steering.

The switching and/or transition operations are managed by a switching unit 4, placed downstream of the reduction law LR, as illustrated in FIG. 2.

This switching unit 4 may also manage the comparison step (d).

Preferably, according to a preferred feature that may constitute an invention on its own, the switching step (e) may include a clipping substep during which the variation rate Grad(V_param) of the speed indicating parameter V_param is clipped by means of a second gradient limiter 5 which uses a second plausible maximum gradient Grad_ref_2, representative of a maximum acceleration or of a maximum deceleration that the vehicle can provide.

This second clipping is carried out mutatis mutandis in a manner similar to the clipping carried out by the first gradient limiter 3 described hereinabove.

In this instance, it consists herein in tolerating the variations of the speed indicating parameter V_param:

$$Grad(V\_param) = [V\_param(t\_n) - V\_param(t\_n-1)] / [(t\_n) - (t\_n-1)]$$

only within limits that are coherent with the actual possible performances of the vehicle, as defined by the second plausible maximum gradient Grad_ref_2.

If the variations of the speed indicating parameter V_param are comprised between the saturation values SAT−, SAT+ of the second gradient limiter 5, the refreshed speed indicating parameter V_param(t_n) is accepted as such.

Otherwise, if the variation exceeds these saturation values SAT−, SAT+, the speed indicating parameter is arbitrarily recalculated on the basis of the plausible maximum gradient Grad_ref_2:

$$V\_param(t\_n) = V\_param(t\_n-1) + Grad\_ref\_2 * [(t\_n) - (t\_n-1)]$$

This second clipping, preferably operated downstream of the switching/transition definition phase and upstream of the assist F1 and safety F2 functions, will allow in particular avoiding taking into consideration possible incoherent variations of the speed indicating parameter V_param which could for example result from discontinuities induced by the switching/transition phase.

In particular, this second clipping may form a precautionary measure complementary or alternative to the management, as of the switching step, of continuous (of differentiability class $C^0$) transitions as described hereinabove.

Moreover, the invention of course concerns a power steering system 1 comprising a controller 10, such as a calculator, enabling application of an instantaneous speed underestimation method according to the invention.

To this end, said controller 10 will comprise one or several electronic and/or software unit(s) including a processing unit 11, which contains at least one underestimation unit 6 applying the reduction law LR, and preferably a comparison/switching unit 4 as well as a second gradient limiter 5.

The controller may also comprise a speed upper limit V_upper acquisition unit 12, preferably comprising a measuring unit 7 which may exploit for example as an input speed V_roue the speed of one or several wheel(s) 2 of the vehicle, and/or a first gradient limiter 3.

Finally, the controller 10 will comprise, respectively assist 13 and safety 14, functional units ensuring the execution of the aforementioned functions F1, F2, respectively.

The invention also concerns as such a vehicle, and in particular a land vehicle comprising one or several drive and steered wheel(s) 2 (preferably two drive wheels, or an all-wheel transmission comprising for example four drive wheels), equipped with such a power steering system 1.

Of course, the invention is not limited to the sole variants described in the foregoing, those skilled in the art being in particular able to freely isolate or combine together the aforementioned features, or substitute them with equivalents thereof.

The invention claimed is:

1. A method for managing a power steering system for a vehicle, the power steering system including a plurality of functions including an assist function that assists a driver in driving the vehicle and a safety function that controls the assist function so that the assist function operates the vehicle at a predetermined Automotive Safety Integrity Level (ASIL) level as defined by standard ISO-26262, each of the assist function and the safety function utilizing an indicating parameter of a speed of the vehicle which represents a longitudinal speed of the vehicle, the method comprising:
   (a) estimating a functional speed, which is representative of an actual longitudinal speed of the vehicle at a considered time, and which is used by default as the indicating parameter of the speed of the vehicle, according to a normal operating mode, (b) estimating a speed upper limit, which is higher than the functional speed and representative of an upper limit of the actual longitudinal speed of the vehicle at the considered time, (c) calculating an underestimated speed by which a predetermined reduction law is applied to the speed upper limit so as to obtain an underestimated speed value, which is lower than the speed upper limit by a predetermined reduction value set by the reduction law, (d) comparing the function speed value, in absolute value, with the underestimated speed value; and, (e) switching, upon a detection that the absolute value of the functional speed is lower than an absolute value of the underestimated speed, from the normal operating mode into a safety mode, by substituting the underestimated speed for the functional speed as the indicating parameter of the speed of the vehicle used as the input for each of the assist and safety functions.

2. The method according to claim 1, wherein the reduction law is established in advance of step (a), through tests and/or simulations during which, at a given non-zero actual longitudinal speed of the vehicle, the indicating parameter of the speed of the vehicle that is utilized by the assist and safety functions is progressively, and artificially, lowered, in absolute value, and corresponding reactions of the safety function and/or of the vehicle are observed, until identifying a low threshold of the speed indicating parameter at which the safety function is no longer able to ensure safety in compliance with the predetermined ASIL level at the given actual longitudinal speed, and then, a reduction value retained for the reduction law is set, from the low threshold of the speed indicating parameter.

3. The method according to claim 1, wherein the reduction law adjusts the reduction value according to the estimated speed upper limit, so as to increase, in absolute value, the reduction value upon a detection that the speed upper limit increases in absolute value.

4. The method according to claim 1, wherein the reduction law is stored in a non-volatile memory in the form of a predetermined table, wherein the table associates to each speed upper limit value a reduction value that is subtracted from the speed upper limit to obtain the underestimated speed, or directly associates to each speed upper limit value an underestimated speed value that takes into consideration the reduction value applicable to each speed upper limit.

5. The method according to claim 1, wherein, during step (b) of estimating a speed upper limit,
at a considered time corresponding to a current iteration, the speed upper limit is assessed from an input speed measurement, and then the speed upper limit is compared with the speed upper limit that has been estimated during a previous iteration, in order to assess a corresponding variation of the speed upper limit per unit of time,
the variation of the speed upper limit per unit of time, representing an observed speed gradient, then the observed speed gradient is compared with a plausible maximum gradient, the plausible maximum gradient being determined in advance of step (a) through acceleration and braking tests of the vehicle, and,
upon a detection that the observed speed gradient is higher, in absolute value, than the plausible maximum gradient, the speed upper limit of the current iteration is corrected by clipping, by applying to the speed upper limit of the previous iteration, the plausible maximum gradient instead of the observed speed gradient.

6. The method according to claim 1, wherein the switching step (e) operates to switch from the normal operating mode into the safety mode, by making the speed indicating parameter pass from the functional speed into the underestimated speed, upon a detection that the functional speed becomes lower, in absolute value, than the underestimated speed.

7. The method according to claim 6, wherein, the switching step (e) includes a clipping substep during which a variation rate of the speed indicating parameter is clipped with a second gradient limiter which uses a second plausible maximum gradient, representative of a maximum acceleration or of a maximum deceleration that the vehicle can provide.

8. The method according to claim 1, wherein the switching step (e) operates a delayed switching from the normal operating mode into the safety mode, by making the speed indicating parameter pass from the functional speed into the underestimated speed only if the functional speed remains lower, in absolute value, than the underestimated speed for a non-zero duration, which reaches or exceeds a predetermined tolerance threshold.

9. The method according to claim 1, wherein the method includes, after the switching step (e), an enhanced safety step (f), during which a safety duration during which the safety mode remains active, is measured, and, upon a detection that the safety duration reaches or exceeds a predetermined warning threshold, the enhanced safety step (f) includes switching from the safety mode into an enhanced safety mode, by making the indicating parameter of the speed of the vehicle pass from the underestimated speed into an enhanced safety speed which is equal to or higher than the speed upper limit.

10. The method according to claim 1, wherein changes of values of the indicating parameter of the speed of the vehicle, which are operated during switching from one operating mode into another operating mode, are smooth such that the values of the indicating parameter are represented by a continuous mathematical function, the continuous mathematical function being differentiable at least once.

11. The method according to claim 1, wherein the safety function controls the assist function so that the assist function operates the vehicle at an ASIL level equal to at least B as defined by the standard ISO-26262.

12. A power steering system comprising a controller programmed to execute the method according to claim 1.

13. The method according to claim 1, wherein, during step (b) of estimating a speed upper limit,
at a considered time corresponding to a current iteration, an input speed measurement of the current iteration is compared with the input speed measurement of a previous iteration in order to assess a corresponding variation of the input speed measurement per unit of time,
the variation of the input speed measurement per unit of time representing an observed speed gradient, then the observed speed gradient is compared with a plausible maximum gradient, the plausible maximum gradient being determined in advance of step (a) through acceleration and braking tests of the vehicle, and
upon a detection that the observed speed gradient is higher, in absolute value, than the plausible maximum gradient, the input speed measurement of the current iteration is corrected by clipping, by applying to the input speed measurement of the previous iteration, the plausible maximum gradient instead of the observed speed gradient.

\* \* \* \* \*